2,702,750

MANUFACTURE OF ARTICLES FROM SUBSTANCES CONTAINING SILICA

Henri George, Paris, France, assignor to Societe Anonyme des Manufactures des Glaces et Produits Chimiques de Saint-Gobain, Chauny & Cirey, Paris, France No Drawing. Application August 6, 1947, Serial No. 766,854. In France March 19, 1942

Section 1, Public Law 690, August 8, 1946
Patent expires March 19, 1962

6 Claims. (Cl. 106—58)

This invention relates to compositions of matter having high industrial value in many fields and to methods of preparing them.

An object of the invention is to manufacture articles having metallic aspect, a highly refractory nature, a very hard substance, and good electrical conductivity from substances containing silica combined or uncombined.

The objects of the invention are accomplished generally speaking by the reaction represented by the formula:

$$SiO_2 + M \rightarrow MSi^n + MO_x$$

in which $SiO_2$ is combined or free silica, M is any reducing metal, MSi is an alloy of metal M with silicon, $n$ signifies that the proportions of M and Si in the alloy are variable, and $MO_x$ is an oxide of metal M. More than one metal may be included in the reaction.

The raw material silica may be in combined or uncombined state. For instance it may be sand, quartz, silica glass or pure fused silica, which are examples of bodies composed largely of free silica, metallic silicates, porcelain, ceramics, which are exemplary of bodies containing substantial quantities of combined silica. Porcelain, for instance, contains kaoline which is a hydrated aluminum silicate, clay, feldspar which is a potassium aluminum silicate, and some quartz. Some of the metallic silicates are preferred over others; for instance nickel and chromium silicates give good results whereas zircon silicates are less satisfactory.

The reducing metals may be employed in the process, and they are illustrated by aluminum, magnesium, the alkali metals sodium, potassium and lithium, and by the alkaline earth metals calcium, barium, and strontium. The reducing metals may be used pure or in alloys or mixtures with other active metals or with auxiliary metals. Alloys may be used for the reduction and may contain Al or Mg with one or several of the other reducing metals. Other metals related to aluminum such as iron, manganese, nickel, cobalt, chromium, molybdenum, tungsten, and glucinium may be added to the above metals to produce particular interstitial alloys. The addition may be made in metallic state to the reaction bath, or as a silicate of the desired metal to the ceramic or other silicious body itself. Inactive matter such as alumina can be added.

The reaction is carried out at high temperature, 700 degrees C. to 900 degrees C. being a satisfactory range, and the reducing metal may be either in liquid or in solid phase. For instance the silicious article may be immersed in molten aluminum, whereupon the process will proceed regularly from the surface of the article inward, or the article may be mixed with a powder of the reducing metal and heated to the reaction temperature. The reaction can be carried to complete the transformation of the article to an alloy containing an interstitial oxide, or it can be halted at any selected intermediate stage of transformation. Thus the finished body may be composed wholly of the new complex or it may have only a surface transformation, depending on the time and conditions of treatment.

For instance the process for changing silica to the new alloyed complex may be used to change the interior of ceramics by adding to the crude paste a selected mixture of silica and reducing metal powder, or if the paste already contains silica, only the desired quantity of powdered metal, or of powdered new complex, thence conducting the heating so as to keep the temperature between 700 and 900 degrees C. long enough to complete the change.

In manufacturing, processes are but little varied; a procedure is established for the making of an article and the manufacturing process is made to conform rigidly to that established standard. Once a satisfactory procedure is set up, variations are largely of laboratory interest. In manufacturing articles by this method it is contemplated that such normal routines will be established and used, and the specification is drawn to facilitate the establishment of such procedures. Nevertheless, the process is widely variable and responds readily to simple methods of control to produce products of different properties and composition, enabling the manufacturer to vary his compositions to suit the needs of different industrial uses. Methods of controlling the composition will be briefly discussed:

The proportion of the metal oxide, for instance $Al_2O_3$, to the alloy, AlSi, and the composition of the alloy within the body depends on the weights of materials taking part in the reaction and on the reaction conditions. The composition of the interstitial alloy will be close to the final composition of the bath. The composition of the compound $Al_2O_3 + AlSi^n$, for instance, will depend on the initial constitution of the article; thus an article made from aluminum silicate, or of alumina and aluminum silicate, will contain a lesser proportion of silicon than does an article made from fused silica. The composition also depends on the relative weights of the article and of the aluminum bath. Furthermore, the composition of the alloy depends on those relative weights. An exemplary process comprises immersing silica, free or combined, or a body or object of silica or silicate, for instance of aluminum silicate, in a bath of molten reducing metal; the mass of metal, the temperature, the time of contact, the pressure, and as the attack proceeds, the composition of the metal or of the bath is varied as functions of the mass and of the surface to be treated and of the result to be attained: the proportion of oxide (particularly alumina) to the alloy (particularly $AlSi^n$), the composition of the alloy, the depth of attack, and the ratio of reducing metal to silica.

Instead of plunging the body into a bath of the reducing metal, the body may be treated with a reductive metal in divided state.

However, it should be remembered in operating a manufacturing process that a procedure involving time, temperature, pressure, constitution and volume of the metal bath are established in advance for each type of goods made and closely followed in the factory.

The alloyed body may be subjected, outside the reaction bath, to chemical, electrical or thermal treatment to increase and to stabilize, inside or on the surface of the body, the proportion of oxide to metal, to modify the crystal structure, or to combine it with other bodies.

In case it is desirable to increase the size of the alumina grains in the transformed article, it can be heated to a temperature over 1000 degrees C. for a sufficient time to produce grains of the desired size, as such heating enlarges them.

The alloy of reducing metal and silicon can be attacked either by an acid or by a basic solution if aluminum is the reducing metal. This alloy can be carried off either by melting or by evaporation. Sulfuric and hydrochloric acids may be used in the chemical alteration of the new compounds. The silica or ceramic blank transformed into an article of the new constitution can be chemically or electrolytically treated in an acid bath for entirely eliminating the interstitial metal. The alumina skeleton so obtained contains about 17% of pores. A subsequent heating over 1500 degrees C. shrinks this skeleton and practically reduces the pores to nothing.

The product produced, composed of a mixture having a strong proportion of metal oxide crystals with an interstitial alloy of silicon and the metal corresponding to the oxide, and possibly other metals, has been given the trade name "Metasil".

The following examples illustrate the invention, but it is to be understood that these examples are complementary to the specification; they do not limit it.

*Example 1*

An object of silica glass (pure fused quartz) was submerged in a bath of aluminum and was transformed progressively beginning with the surfaces in contact with the bath, to a very hard body having a metallic aspect being a conductor of electricity and being very refractory, composed of 80% alumina and 20% of an alloy of aluminum and silicon containing four times more aluminum than silicon.

The same result is obtained with a porcelain object having a ceramic base of aluminum silicate. The presence of certain other metal silicates such as nickel was favorable, whereas that of others such as zircon was not so favorable.

The transformation in both cases was effectuated at constant volume, the object conserving both its form and its dimensions.

*Example 2*

A rod of silica 6 mm. in diameter was completely transformed in five hours at 900 degrees C. in a bath of aluminum at atmospheric pressure to alumina and interstitial aluminum silicon alloy. The alloy is the richer in silicon as the mass of the bath is poor with respect to the mass of silica.

*Example 3*

Nickel silicate was transformed to the new material and the nickel was found in the interstitial alloy.

*Example 4*

The silicates of alumina give a new material containing only alumina, aluminum and silicon. This is a method that may be employed to enrich bauxites and clays for the manufacture of aluminum.

If the attack is prolonged after transformation of the silica the complex is disaggregated and alumina precipitates in the bath in a state of purity.

It is to be noted that the bath itself is not oxidized during these reactions. It is apparently enriched only in silicon and may be used in the manufacture of alloys such as "Alpax." Thus, not only the product but the bath is commercially useful in this process.

*Example 5*

The principal difficulty in the fabrication of ultra refractories, by which term is meant those which withstand more than 1600 degrees C. under load, resides in the elimination of the silica that forms the fusible vitreous phases.

According to this invention the paste of refractory material added to aluminum is subjected to firing; the silica is transformed to new material during the course of the operation and there results the replacement in situ of a vitreous element by an element that is crystalline around 2000 degrees C. The alloy resulting from the reaction is disseminated through the mass of the refractory and confers upon it certain qualities of electric or thermal conductivity that may be put to use.

It may be eliminated if it is decided to be useful to do so.

*Example 6*

New material powders obtained by the treatment of sand according to the processes of this invention are useful as abrasives. They may be agglomerated by ceramic methods in particular, with silica or a silicate of aluminum and serve to make grinding wheels, refractory pieces, or electrical resistances of which the resistivity can be determined in advance.

The objects transformed at constant volume to new material may be used to make grinding wheels and tools of which the grain depends upon a thermal treatment to which the article is subjected after transformation. Furthermore, an acid attack on the surface may be used to disengage the crystals of alumina.

*Example 7*

A superficial transformation of pieces of silica or of ceramic gives the equivalent of a metallization that is more or less deep, with this difference, that the transformation is made at constant volume, the dimensions of the piece not being altered; this can be put to profit in the manufacture of spark plugs. The interior and exterior surfaces of the insulation can be transformed to the new material, and may be fused to metal pieces such as "Alpax."

*Example 8*

To make resistances, or elements of rheostats, tubes or rods of silica or of ceramic are taken and transformed to the new material by the processes described above. Thereafter a part of the alloy is eliminated to produce the resistivity desired and the resulting product is stabilized by a chemical, ceramic, or electrolytic treatment of the surface, or by enameling.

A resistor for heating at high temperature and for application in electric furnaces has been made in the same way, but by increasing in the complex metals related to aluminum such as iron, manganese, nickel, cobalt, chromium, molybdenum, tungsten, and glucinium. This increase is made either with the metal in a bath or in the state of a silicate in the composition of the ceramic.

These resistors may also be made to serve for electric lighting. They lend themselves well to the construction of cathodes, filaments, or getters in heating apparatus because of a relatively great surface and because of the facility with which they may be recovered with oxides, with oxidizable metals, or with mixtures of great electronic emission.

*Example 9*

A porcelain object, or a silica object, is first transformed by the steps of the process. Thereafter all the interstitial metal is eliminated by chemical, thermal or electrolytic means. There is thus produced by a new method an object composed of pure oxide. These objects can be reworked, particularly to diminish their porosity, by any known ceramic treatment. The transformed blank can be chemically or electrolytically treated in an acid bath to entirely eliminate the interstitial metal. The alumina skeleton so obtained contains about 17% of pores. A subsequent heating over 1500 degrees C. shrinks the skeleton and practically reduces the pores to nothing.

*Example 10*

A silica rod having a diameter of 5 mm. was entirely transformed in an aluminum bath at 700 degrees C. in eight hours.

*Example 11*

A silica rod having a diameter of 7 mm. was completely transformed in an aluminum bath at 900 degrees C. in eight hours.

*Example 12*

Agglomerated nickel silicate treated by a molten aluminum bath was transformed into crystalline alumina embedded in an alloy of nickel, aluminum, and silicon, the composition of which depended upon the relative weight of the nickel silicate article and of the molten aluminum bath.

*Example 13*

Sillimanite, a mixture of refractory aluminum silicates, was mixed with powdered metallic aluminum moistened, molded, and burned. All silica was transformed. The new refractory was free of vitreous silica and had great crushing resistance. Silica powder treated in a molten aluminum bath gives new material grains which collect in the bottom of the bath because of their greater density. These grains are gathered with an excess of molten aluminum, cooled, and treated with caustic soda solution which combined with the excess of aluminum frees the complex alloy-oxide grains.

*Example 14*

A grinding wheel used by dentists can be prepared from a fused silica disk having the form of the finished grinding wheel. A standard process as described hereinabove is employed for the transformation. After the transformation a convenient heating modifies the size of the alumina grains embedded in the $AlSi^n$ alloy and a treatment by an acid partially disengages the alumina grains from the alloy support. By this method wheels of any required degree of coarseness may be produced.

*Example 15*

Chromium silicate, powdered metallic chromium, and clay are mixed with a proportion of powdered aluminum sufficient to reduce chromium silicate and combine with free initial chromium and with the subsequently freed chromium, giving a refractory alloy which is useful as an electric resistance.

*Example 16*

A fused silica filament is transformed by the process of this invention and can be employed in electric lighting.

The many examples hereinabove given are merely illustrative of the wide and varied uses to which the invention can be put and of the process variations which can be employed by persons skilled in the art. The alloys of reducing metals and silicon can be attacked either by an acid or by a basic solution if aluminum is the reducing metal. The alloy can be carried off either by melting or evaporation. A cathode treatment can be used to deposit a metallic layer on the transformed article. An anode treatment will increase the alumina proportion of the surface layer.

As many apparently widely different embodiments of the present invention may be made without departing from the spirit and scope thereof, it is to be understood that the invention is not limited to the specific embodiments, except as defined in the appended claims.

What is claimed is:

1. The method of altering the appearance, chemical constitution, hardness, and electrical conductivity of a manufactured article of non-metallic aspect comprised of an oxygenated silicon compound without changing its form or size which consists in its essential steps of heating the said object to a range about 700° C. to 900° C. in contact with aluminium during a period of time sufficient to transform in situ a substantial part of the siliceous substance of the object into a new substance having a metallic aspect and being hard, very refractory and conductor of electricity, and consisting in particles of alumina in interstitial relation with an alloy of aluminium and silicon.

2. The method of altering the appearance, chemical constitution, hardness, and electrical conductivity of a manufactured article of non-metallic aspect comprised of an oxygenated silicon compound without changing its form or size which consists in its essential steps of heating the said object circa 700° C. to 900° C. in contact with magnesium during a period of time sufficient to transform in situ a substantial part of the siliceous substance of the object into a new substance having a metallic aspect and being hard, very refractory and a conductor of electricity, and consisting in particles of magnesia embedded in a matrix of an alloy of magnesium and silicon.

3. The method of altering the appearance, chemical constitution, hardness, and electrical conductivity of a manufactured article of non-metallic aspect comprised of an oxygenated silicon compounded without changing its form or size which consists in its essential steps of heating the said object to a range from 700° C. to 900° C. in contact with aluminium during a period of time sufficient to transform in situ a substantial part of the siliceous substance of the object into a new substance having a metallic aspect and being hard, very refractory and conductor of electricity, and consisting in particles of alumina embedded in a matrix of an alloy of aluminium and silicon containing about 20% silicon.

4. The method of altering the appearance, chemical constitution, hardness, and electrical conductivity of a manufactured article of non-metallic aspect comprised of an oxygenated silicon compound without changing its form or size which consists in its essential steps of heating the said object to a range from 700° C. to 900° C. in contact with aluminium during a period of time sufficient to transform in situ a substantial part of the siliceous substance of the object into a new substance having a metallic aspect and being hard, very refractory and conductor of electricity, composed of about 80% alumina embedded in a matrix consisting essentially of an alloy of aluminium and silicon containing about 4 times as much aluminium as silicon.

5. The method of altering the appearance, chemical constitution, hardness, and electrical conductivity of a manufactured article of non-metallic aspect comprised of an oxygenated silicon compound without changing its form or size which consists in its essential steps of heating the said object to a range from 700° C. to 900° C. in contact with magnesium during a period of time sufficient to transform in situ a substantial part of the siliceous substance of the object into a new substance having a metallic aspect and being hard, very refractory, conductor of electricity and containing a silicon magnesium alloy in interstitial relation with alumina.

6. A method according to claim 1, in which the object contains nickel silicate, in order to transform it into an article containing particles of alumina embedded in a matrix of an alloy of silicon, nickel and aluminium.

References Cited in the file of this patent

UNITED STATES PATENTS

| Number | Name | Date |
|---|---|---|
| 90,565 | Lynd | May 25, 1869 |
| 429,386 | Parrish | June 3, 1890 |
| 788,132 | Glynn | Apr. 25, 1905 |
| 1,448,586 | Allen | Mar. 13, 1923 |
| 1,526,127 | Flick | Feb. 10, 1925 |
| 1,648,954 | Marden | Nov. 15, 1927 |
| 1,657,389 | Gwyer et al. | Jan. 24, 1928 |
| 1,856,303 | White | May 3, 1932 |
| 1,896,190 | Smith et al. | Feb. 7, 1933 |
| 1,968,300 | Archer | May 9, 1933 |
| 2,054,427 | Kirsebom | Sept. 15, 1936 |
| 2,233,410 | Frasch | Mar. 4, 1941 |
| 2,331,232 | Ross | Oct. 5, 1943 |
| 2,376,757 | Chanosky | May 22, 1945 |
| 2,406,275 | Wejnarth | Aug. 20, 1946 |
| 2,441,534 | Norton | May 11, 1948 |

OTHER REFERENCES

Mellor: Comprehensive Treatise on Inorganic and Theoretical Chemistry, vol. 5, pages 209, 211 and 217.